United States Patent

Kojima et al.

[11] Patent Number: 6,073,918
[45] Date of Patent: Jun. 13, 2000

[54] VIBRATION ISOLATING APPARATUS

[75] Inventors: Hiroshi Kojima; Yuzo Hattori, both of Yokohama, Japan

[73] Assignee: Bridgestone Corporation, Tokyo, Japan

[21] Appl. No.: 09/166,099

[22] Filed: Oct. 5, 1998

[30] Foreign Application Priority Data

Oct. 8, 1997 [JP] Japan ................................. 9-276129

[51] Int. Cl.[7] ...................................................... F16F 5/00
[52] U.S. Cl. ...................................... 267/140.14; 267/219
[58] Field of Search .......................... 267/140.11, 140.12, 267/140.13, 140.15, 140.2, 219; 248/562, 636

[56] References Cited

U.S. PATENT DOCUMENTS 5,330,164  7/1994  Takano et al. .................... 267/104.14
5,370,375  12/1994  Kojima ............................. 267/140.14

*Primary Examiner*—Christopher P. Schwartz
*Assistant Examiner*—Mariano Sy
*Attorney, Agent, or Firm*—Oliff & Berridge, PLC

[57] ABSTRACT

A partitioning member is disposed within an outer cylinder metal fitting. A space which is defined by the partitioning member and an elastic body forms a main liquid chamber. The main liquid chamber and a first auxiliary liquid chamber are disposed with the partitioning member therebetween. A shake orifice and an idle orifice are formed at the partitioning member and the idle orifice is opened and closed by a rotor. A second diaphragm is disposed at the first auxiliary liquid chamber side and a clearance between the second diaphragm and the lower surface of the partitioning member forms a second auxiliary liquid chamber. When shake vibration which is low frequency vibration is generated, the vibration is damped and absorbed by the shake orifice. When idle vibration is generated, the idle orifice is opened and the high frequency vibration is absorbed.

18 Claims, 6 Drawing Sheets

VIBRATION ISOLATING APPARATUS

BACKGROUND OF THE INVENTION

1. Field of the Invention

The present invention relates to a vibration isolating apparatus which prevents transmission of vibration from a vibration generating member and is applicable to a case in which transmission of vibration from, for example, an engine disposed on a vehicle is prevented.

2. Description of the Related Art

For example, a structure is known in which a vibration isolating apparatus serving as an engine mount is disposed between a vehicle engine which is a vibration generating portion and a vehicle body which is a vibration receiving portion, and vibration generated by the engine is absorbed by this vibration isolating apparatus and is prevented from being transmitted to the vehicle body.

Namely, an example of this vibration isolating apparatus includes the one having a structure in which a main liquid chamber and an auxiliary liquid chamber are provided inside and these liquid chambers are communicated with each other by a restricting passage serving as an orifice. When the disposed engine is operated so as to generate vibration, the vibration is absorbed or damped by liquid within the restricting passage which communicates these liquid chambers due to liquid-column resonance or the like as reduced dynamic spring. Transmission of the vibration is thereby prevented.

On the other hand, the range of vibration frequencies becomes large due to the wide range of operating states of an engine. Accordingly, in recent years, a vibration isolating apparatus which has restricting passages having different lengths and inner diameters has been proposed in order to maintain vibration isolating characteristics against each of vibrations of such wide range of frequencies. Alternatively, a vibration isolating apparatus has been proposed in which a membrane made of a rubber is provided on the opposite side of a partitioning member, which partitions a main liquid chamber and an auxiliary liquid chamber, with respect to the main liquid chamber, deformation ability of this membrane is used so as to reduce the dynamic spring constant of vibration having a high frequency range, and the vibration having a high frequency range is thereby reduced.

However, when vibration having a low frequency range is generated at the same time that the vibration having a high frequency range is generated, it is difficult for any of the above-structured vibration isolating apparatuses to sufficiently reduce the vibrations.

SUMMARY OF THE INVENTION

With the aforementioned in view, an object of the present invention is to provide a vibration isolating apparatus which can reduce vibrations sufficiently even when vibration having a low frequency range is generated at the same time that vibration having a high frequency range is generated.

The present invention provides a vibration isolating apparatus, comprising: a first attaching member which is connected to one of a vibration generating portion and a vibration receiving portion; a second attaching member which is connected to another of the vibration generating portion and the vibration receiving portion; an elastic body which is disposed between the first attaching member and the second attaching member; a main liquid chamber whose portion of a partitioning wall is formed by the elastic body, the main liquid chamber being filled with liquid, and the content volume of the main liquid chamber being changed due to deformation of the elastic body; a first auxiliary liquid chamber which is communicated with the main liquid chamber by a passage and which is filled with the liquid; a first diaphragm which is elastically deformable and forms at least a portion of a partitioning wall of the first auxiliary liquid chamber; a partitioning member which partitions the main liquid chamber and the first auxiliary liquid chamber; a second auxiliary liquid chamber which is communicated with the main liquid chamber by a passage and which is filled with the liquid; a second diaphragm which is elastically deformable and forms at least a portion of a partitioning wall of the second auxiliary liquid chamber and which is more rigid than the first diaphragm; a valve which opens and closes the passage connecting the main liquid chamber and the second auxiliary liquid chamber; and an actuator which is connected to and operates the valve.

Further, in the above-described vibration isolating apparatus, the present invention provides a vibration isolating apparatus, wherein the second diaphragm is disposed at the first auxiliary liquid chamber side of the partitioning member.

The operation of the vibration isolating apparatus of the present invention will be explained hereinafter.

When vibration having a low frequency range is transmitted from the vibration generating portion which is connected to any one of the attaching members, the vibration is damped due to deformation of the elastic body.

Moreover, the content volume of the main liquid chamber is changed due to this deformation of the elastic body. However, at this time, by closing the passage connecting the main liquid chamber and the second auxiliary liquid chamber by the valve, liquid does not flow into the second auxiliary liquid chamber and flows positively into the first auxiliary liquid chamber. As a result, the changes in pressure are generated in the liquid within the passage communicating the main liquid chamber and the first auxiliary liquid chamber. Accordingly, the first diaphragm, which is elastically deformable and forms at least a portion of the partitioning wall of this first auxiliary liquid chamber, is deformed.

In short, when the vibration having a low frequency range is transmitted from the vibration generating portion, the vibration having a low frequency range is damped by both the elastic body and the liquid within the passage connecting the main liquid chamber and the first auxiliary liquid chamber. Thus, it is difficult for the vibration to be transmitted to the vibration receiving portion.

On the other hand, when the frequency of the vibration is changed and the vibration having a high frequency range, which cannot be reduced by the passage between the main liquid chamber and the first auxiliary liquid chamber, is transmitted from the vibration generating portion connected to any one of the attaching members, the content volume of the main liquid chamber is changed due to deformation of the elastic body in the same way as in the aforementioned transmission.

At this time, the actuator operates the valve in accordance with the frequency of the vibration, and the passage connecting the main liquid chamber and the second auxiliary liquid chamber is opened. Due to changes in the content volume of this main liquid chamber, changes in pressure are generated in the liquid within the passage connecting the second auxiliary liquid chamber and the main liquid chamber. Accordingly, the second diaphragm, which is elastically deformable and forms at least a portion of the partitioning wall of the second auxiliary liquid chamber, is deformed.

As a result, when the vibration having a high frequency range is transmitted from the vibration generating portion, dynamic spring constant of the vibration is reduced by the passage connecting the main liquid chamber and the second auxiliary liquid chamber, the vibration having a high frequency range is absorbed, and it is difficult for the vibration to be transmitted to the vibration receiving portion.

Further, the second diaphragm is formed more rigid than the first diaphragm and the passage connecting the main liquid chamber and the first auxiliary liquid chamber is invariably opened. Consequently, when the vibration having a low frequency range is generated together with the vibration having a high frequency range, the first diaphragm can be deformed, such that this vibration having a low frequency, which may be generated at the same time that the vibration having a high frequency range is vibrated, can be damped by the passage connecting the main liquid chamber and the first auxiliary liquid chamber.

In other words, in accordance with the vibration isolating apparatus of the present invention, the vibration having a low frequency range is damped, dynamic spring constant of the vibration having a high frequency range is reduced, and the vibration having a low frequency range, which may be generated at the same time that the vibration having a high frequency range is generated, is damped. Therefore, the vibration having any vibration frequency is absorbed appropriately and the wide range of vibrations can be reduced.

For example, assume that the vibration generating portion is an engine and the vibration receiving portion is a vehicle body. The vibration having a low frequency range which is generated when the vehicle travels at a high speed range is damped. At the time of idling in which the vibration having a high frequency range is generated, liquid-column resonance is generated and dynamic spring constant is reduced. The respective vibrations are thereby reduced and the vibration having a low frequency range, which may be generated at the time of idling in addition to the vibration having a high frequency range, can be reduced.

Further, in addition to the above-described structure, the present invention provides a vibration isolating apparatus having a structure in which the second diaphragm is disposed at the first auxiliary liquid chamber side of the partitioning member.

If the second diaphragm is provided on the opposite side of the partitioning member with respect to the main liquid chamber, the second diaphragm is deformed and the internal pressure of the main liquid chamber is absorbed when the vibration having a low frequency range is generated. Thus, there is the concern that the loss of internal pressure of the main liquid chamber is great and that the vibration having a low frequency range is damped insufficiently. However, in the vibration isolating apparatus having the above-described structure, since the second diaphragm is not on the opposite side of the partitioning member with respect to the main liquid chamber, there is no worry that the vibration having a low frequency range is damped insufficiently.

DESCRIPTION OF THE PREFERRED EMBODIMENTS

Next, a vibration isolating apparatus relating to an embodiment of the present invention will be explained on the basis of FIGS. 1 through 6.

Figure 1:
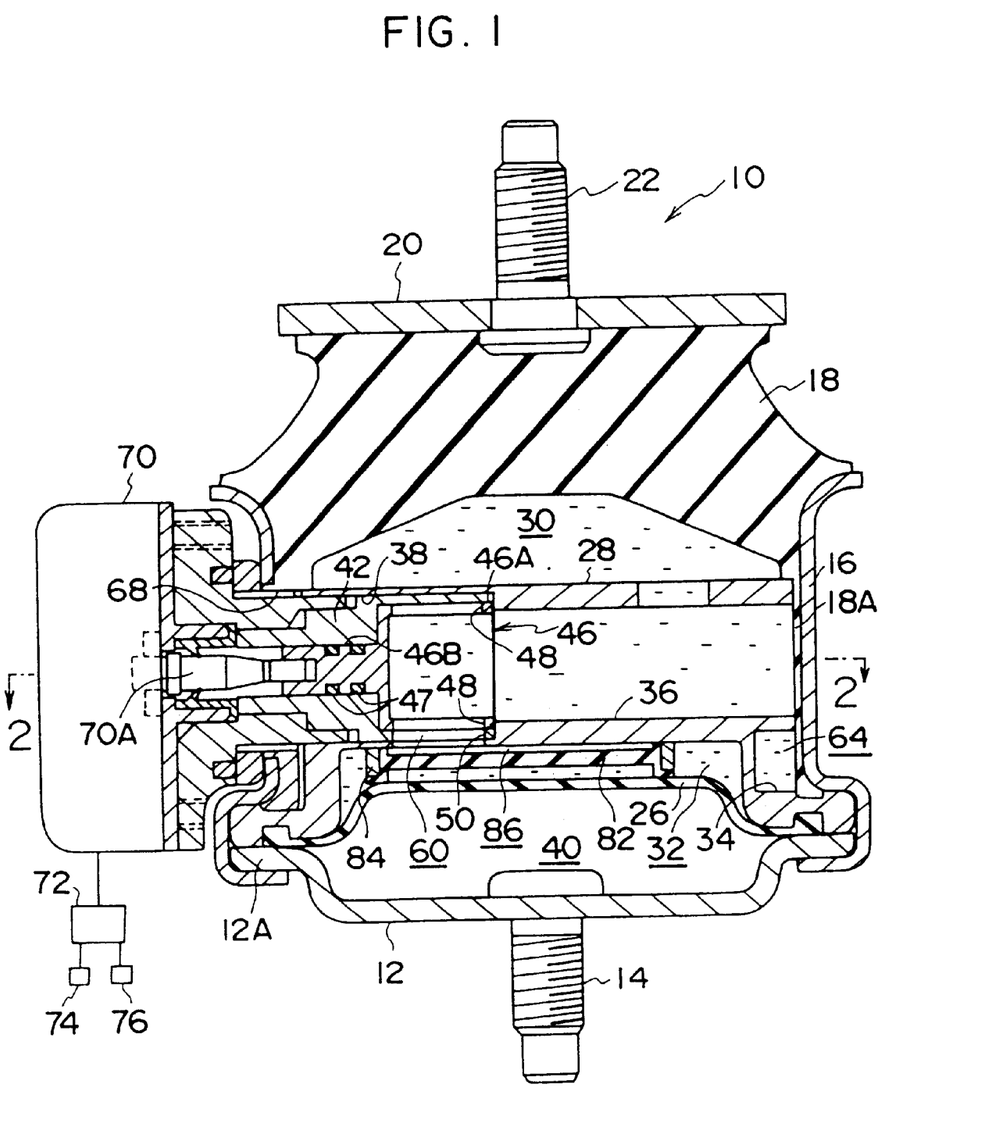
FIG. 1 is a cross-sectional view which shows a vibration isolating apparatus relating to an embodiment of the present invention when idle vibration is generated.

As shown in FIG. 1 describing the present embodiment, a dish-shaped bottom plate metal fitting 12 serving as a first attaching member is formed at a lower portion of a vibration isolating apparatus 10, and a bolt 14 for connecting and adhering this vibration isolating apparatus 10 to an unillustrated vehicle body is provided at the lower portion of this bottom plate metal fitting 12. A flange portion 12A is provided at the outer side of this bottom plate metal fitting 12, and an outer cylinder metal fitting 16, which is cylindrical and is formed so that the upper portion is wide, is disposed at the upper portion of this flange portion 12A.

A cylindrical elastic body 18 made of a rubber is bonded by vulcanization to the inner circumferential surface of this outer cylinder metal fitting 16, and a thin rubber layer 18A, which is thin and extends downwardly in a ring shape, is formed at the lower portion of this elastic body 18. The upper central portion of this elastic body 18 is bonded by vulcanization to a top plate metal fitting 20 serving as a second attaching member, and a bolt 22, which is used for connecting an unillustrated engine, protrudes upwardly from the central portion of this top plate metal fitting 20.

A cylindrical partitioning member 28 is disposed at a lower portion of the elastic body 18 and a space is provided between the elastic body 18 and the partitioning member 28. The partitioning member 28 is fit with the outer cylinder metal fitting 16 via the thin rubber layer 18A. The space defined by the elastic body 18 and the partitioning member 28 forms a main liquid chamber 30 and is filled with liquid, e.g., water, oil, or the like. Accordingly, a partitioning wall of the main liquid chamber 30, which is filled with liquid, is formed by the elastic body 18 and the partitioning member 28. This partitioning member 28 can be manufactured by molding integrally from a synthetic resin or a metal such as aluminum or the like.

Further, the lower portion of the partitioning member 28 protrudes outwardly and is nipped between the lower portion of the outer cylinder metal fitting 16 and the flange portion 12A of the bottom plate metal fitting 12. Since the lower portion of the outer cylinder metal fitting 16 is caulked to the outer circumferential portion of the flange portion 12A of the bottom plate metal fitting 12, the bottom plate metal fitting 12, the outer cylinder metal fitting 16, and the partitioning member 28 are fixed integrally.

Moreover, a first diaphragm 26, which is thin, made of a rubber, and can be elastically deformed, is disposed so as to oppose the lower surface of the partitioning member 28 in a state in which the outer circumferential portion of the first diaphragm 26 is nipped between the lower portion of the partitioning member 28 and the flange portion 12A of the bottom plate metal fitting 12.

Accordingly, a space formed between the first diaphragm 26 and the lower surface of the partitioning member 28 forms a first auxiliary liquid chamber 32, and a space formed between the lower side of the first diaphragm 26 and the bottom portion of the bottom plate metal fitting 12 forms a first air chamber 40. Consequently, this first diaphragm 26 is easily deformed.

As shown in FIG. 1, a groove portion 34 is formed on the outer circumferential surface of the partitioning member 28 in the circumferential direction thereof. A shake orifice 64 is a passage formed by this groove portion 34 and the inner circumferential surface of the thin rubber layer 18A, and one end of the shake orifice 64 extends upwardly and is connected to the main liquid chamber 30. Further, the other end of this shake orifice 64 extends inwardly and is connected to the first auxiliary liquid chamber 32. This shake orifice 64 serves as a restricting passage for absorbing shake vibration.

Figure 2:
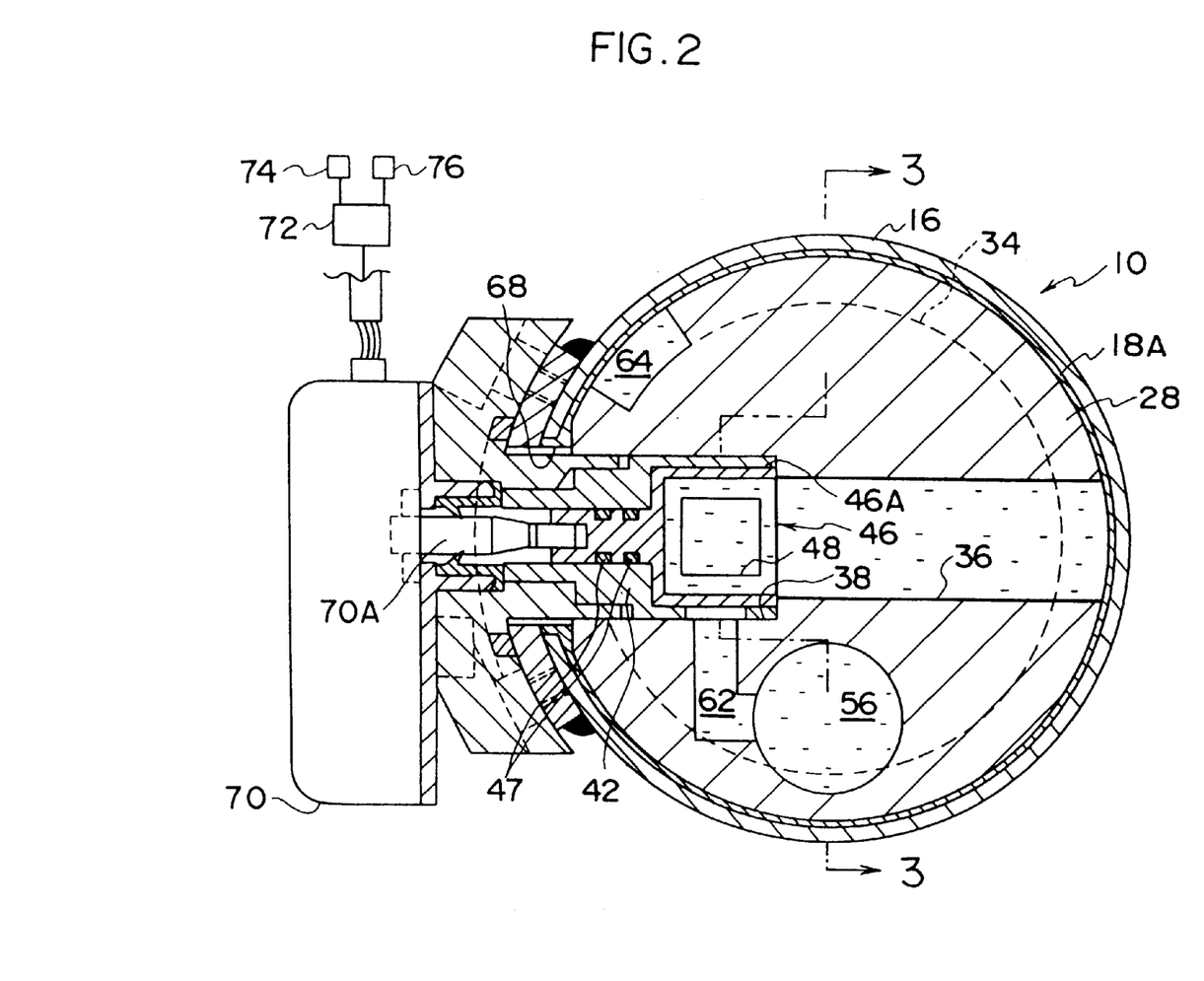
FIG. 2 is a cross-sectional view, taken along line 2—2 in FIG. 1.
Figure 3:
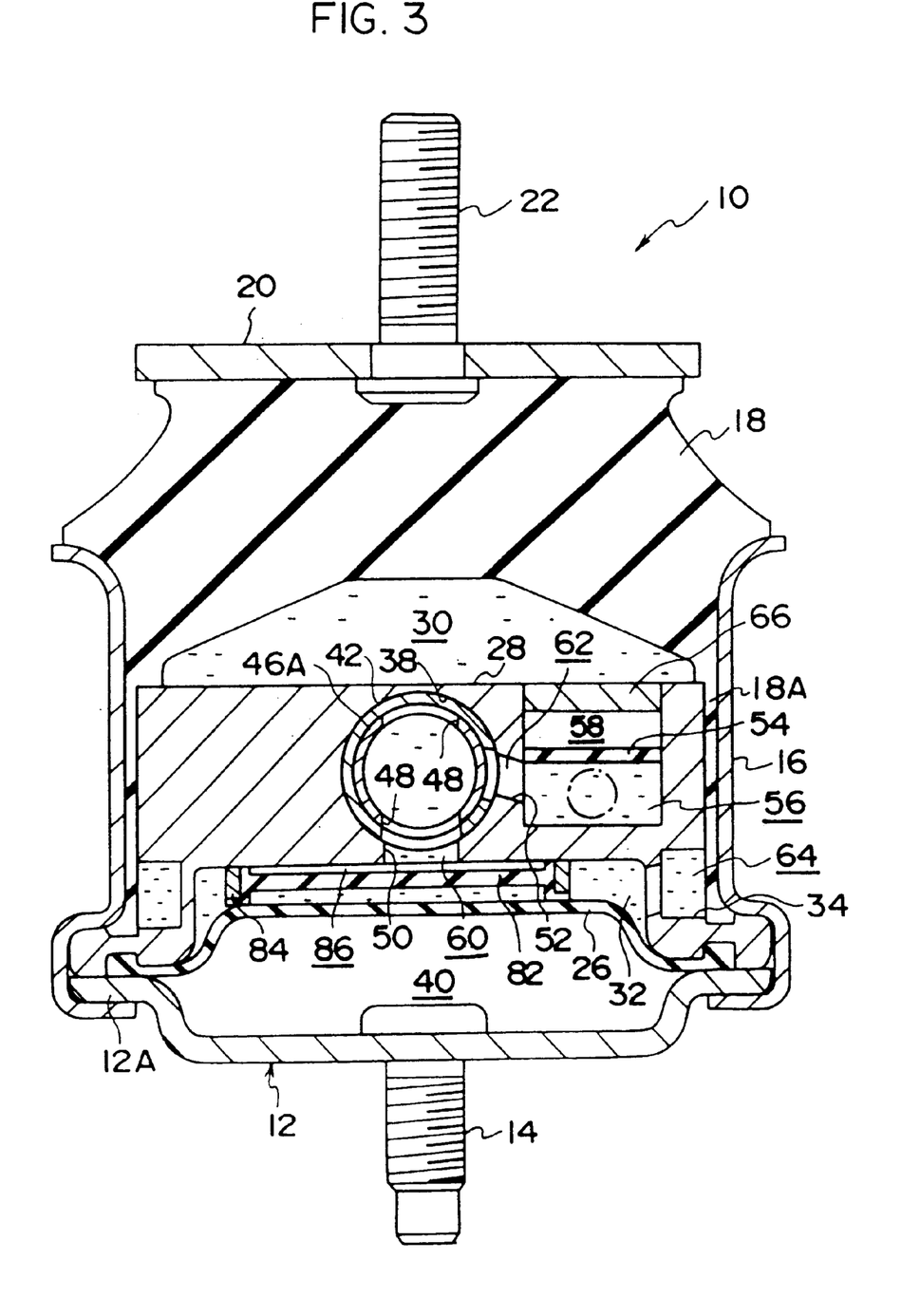
FIG. 3 is a cross-sectional view, taken along line 3—3 in FIG. 2.

On the other hand, as shown in FIGS. 1 through 3, a circular hole 36, which extends in the radius direction of the partitioning member 28 and serves as a passage having a large diameter, is formed at the partitioning member 28. One end of this circular hole 36 is opened upwardly and connected to the main liquid chamber 30. A counter boring portion 38, whose diameter is larger than that of the circular hole 36, is formed at the other end of this circular hole 36. A sleeve 42 is fit into this counter boring portion 38.

A rotor 46 serving as a valve is inserted rotatably into this sleeve 42. In this rotor 46, a cylindrical portion 46A having a large diameter is formed at the right portion in FIG. 1 and a narrow shaft portion 46B serving as a rotational shaft is formed at the left portion in FIG. 1. Further, an O-ring 47 is fit into the outer circumference of this narrow shaft portion 46B, and due to this O-ring 47, liquid is not leaked to the outside of the partitioning member 28 via a clearance between the sleeve 42 and the narrow shaft portion 46B.

Moreover, as shown in FIG. 3, a pair of through-holes 48, which communicate the inner side and the outer side of the cylindrical portion 46A, are formed at the portions of the cylindrical portion 46A of the rotor 46 which are different from each other by 180° in the circumferential direction thereof.

Further, a second diaphragm 82, which is made of a rubber, can be elastically deformed, and is more rigid than the first diaphragm 26, is disposed at the lower portion of the partitioning member 28. This second diaphragm 82 is attached to a ring-shaped bracket 84 in a state in which the outer circumferential portion of the second diaphragm 82 is bonded by vulcanization to the inner circumferential surface of the bracket 84. This bracket 84 is adhered to the lower surface of the partitioning member 28 by adhesive agent or the like. As a result, the second diaphragm 82 is disposed at the first auxiliary liquid chamber 32 side, which is the lower surface side of the partitioning member 28.

A clearance between the second diaphragm 82 and the lower surface of the partitioning member 28 forms a second auxiliary liquid chamber 86 which is filled with liquid. This second diaphragm 82 is elastically deformable and forms at least a portion of a partitioning wall of the second auxiliary liquid chamber 86.

In contrast, a communication hole 50 is formed at a portion of the sleeve 42 and the partitioning member 28 corresponding to the lower portion of the cylindrical portion 46A. When the rotor 46 is rotated and the through-hole 48 opposes this communication hole 50, the circular hole 36 and the second auxiliary liquid chamber 86 are communicated.

In short, due to the circular hole 36 and the communication hole 50, an idle orifice 60, which communicates the main liquid chamber 30 and the second auxiliary liquid chamber 86 and serves as a restricting passage for absorbing idle vibration, is formed.

On the other hand, as shown in FIGS. 2 and 3, at a portion of the sleeve 42 and the partitioning member 28 corresponding to the transverse side of the cylindrical portion 46A, a hole portion 52 for booming which has a small diameter is formed diagonally downward from the cylindrical portion 46A. A third auxiliary liquid chamber 56, which forms a disc-shaped space, is formed at a portion within the partitioning member 28 corresponding to an opening end of this hole portion 52 for booming. The end portion of the hole portion 52 for booming is opened to the third auxiliary liquid chamber 56. Accordingly, when the rotor 46 is rotated and the through-hole 48 opposes this hole portion 52 for booming, the circular hole 36 and the third auxiliary liquid chamber 56 are communicated.

In short, due to the circular hole 36 and the hole portion 52 for booming, an orifice 62 for booming, which communicates the main liquid chamber 30 and the third auxiliary liquid chamber 56 and serves as a restricting passage for absorbing booming noise, is formed.

A thin third diaphragm 54 which is made of a rubber is disposed at the upper portion of this third auxiliary liquid chamber 56 within the partitioning member 28. This third diaphragm 54 forms an elastically deformable partitioning wall of the third auxiliary liquid chamber 56.

Further, a lid member 66 is disposed at the upper portion of the partitioning member 28 and a space is formed between the lid member 66 and the third diaphragm 54. The space between the lid member 66 and the third diaphragm 54 is sealed by this lid member 66 and is filled with gas such as air or the like.

Namely, the space between this third diaphragm 54 and the lower surface of the lid member 66 forms a second air chamber 58, which is built in the partitioning member 28 and is filled with gas. This second air chamber 58 is disposed so as to be adjacent to the third auxiliary liquid chamber 56 with the third diaphragm 54, which serves as an elastically deformable partitioning wall of the third auxiliary liquid chamber 56, therebetween. Accordingly, the third diaphragm 54 can be deformed.

In other words, the third diaphragm 54 forms a portion of the partitioning wall of the third auxiliary liquid chamber 56. As shown in FIG. 3, the surface area of this third diaphragm 54 is set smaller than that of the first diaphragm 26, which forms a portion of the partitioning wall of the first auxiliary liquid chamber 32. Thus, the third diaphragm 54 is more rigid than the first diaphragm 26.

Figure 4:
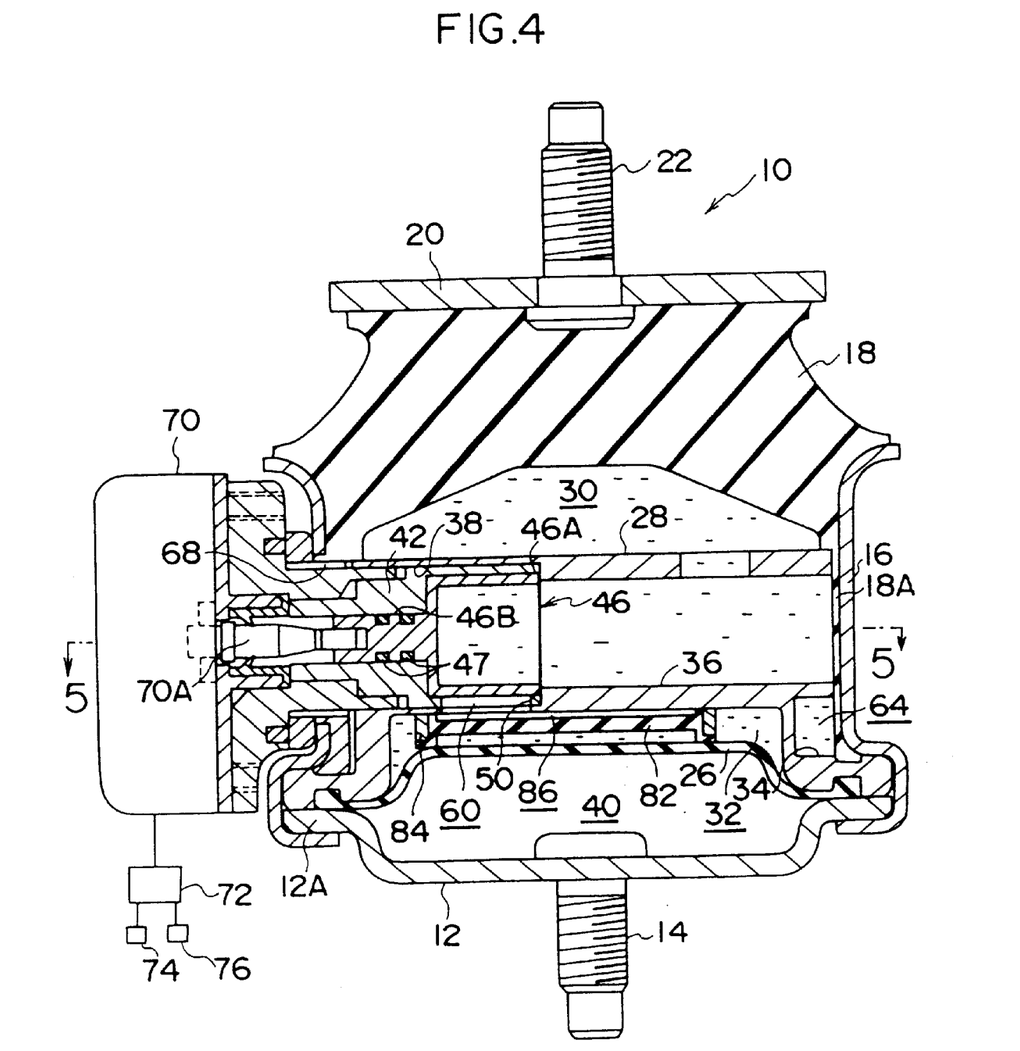
FIG. 4 is a cross-sectional view which shows a vibration isolating apparatus relating to the embodiment of the present invention when shake vibration is generated.
Figure 5:
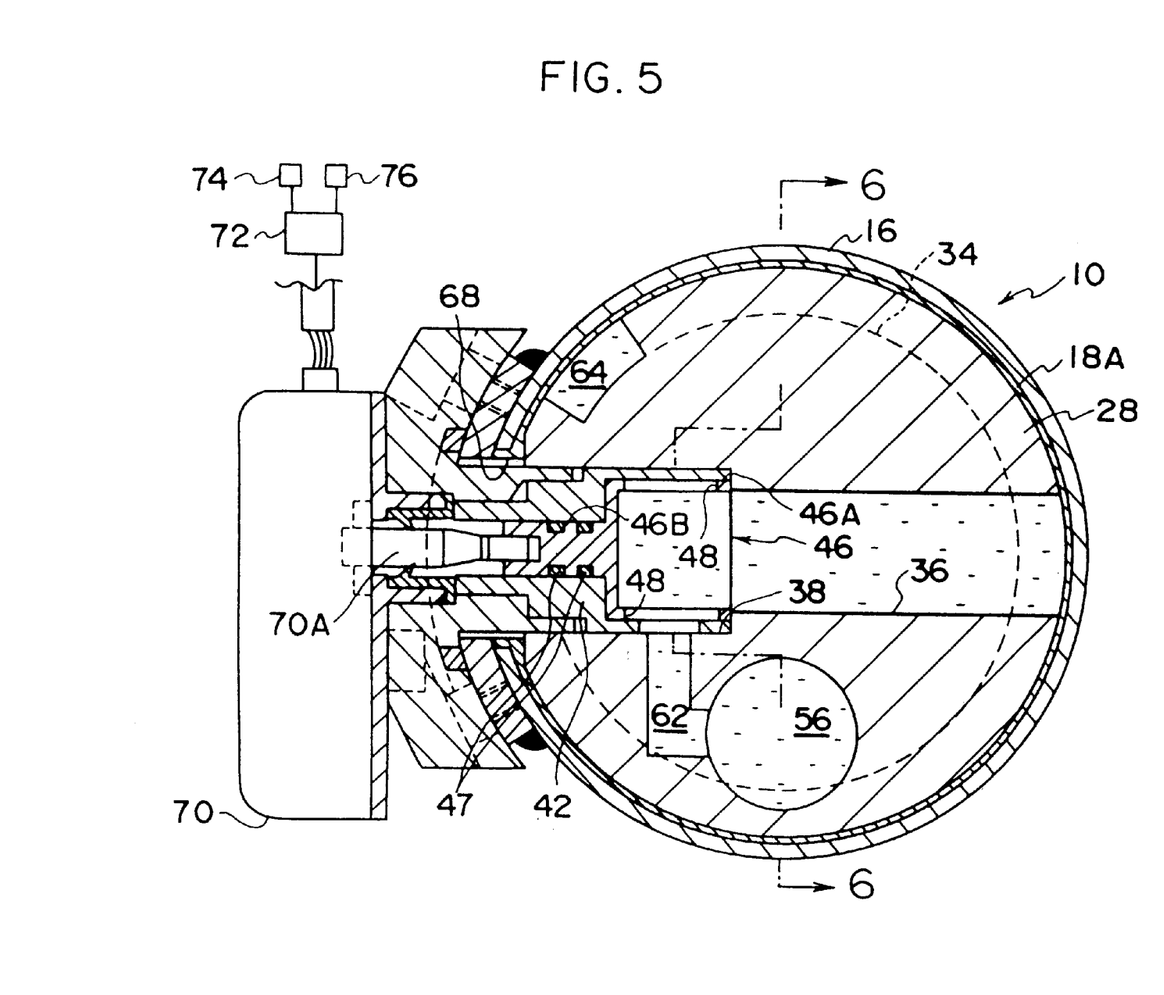
FIG. 5 is a cross-sectional view, taken along line 5—5 in FIG. 4.
Figure 6:
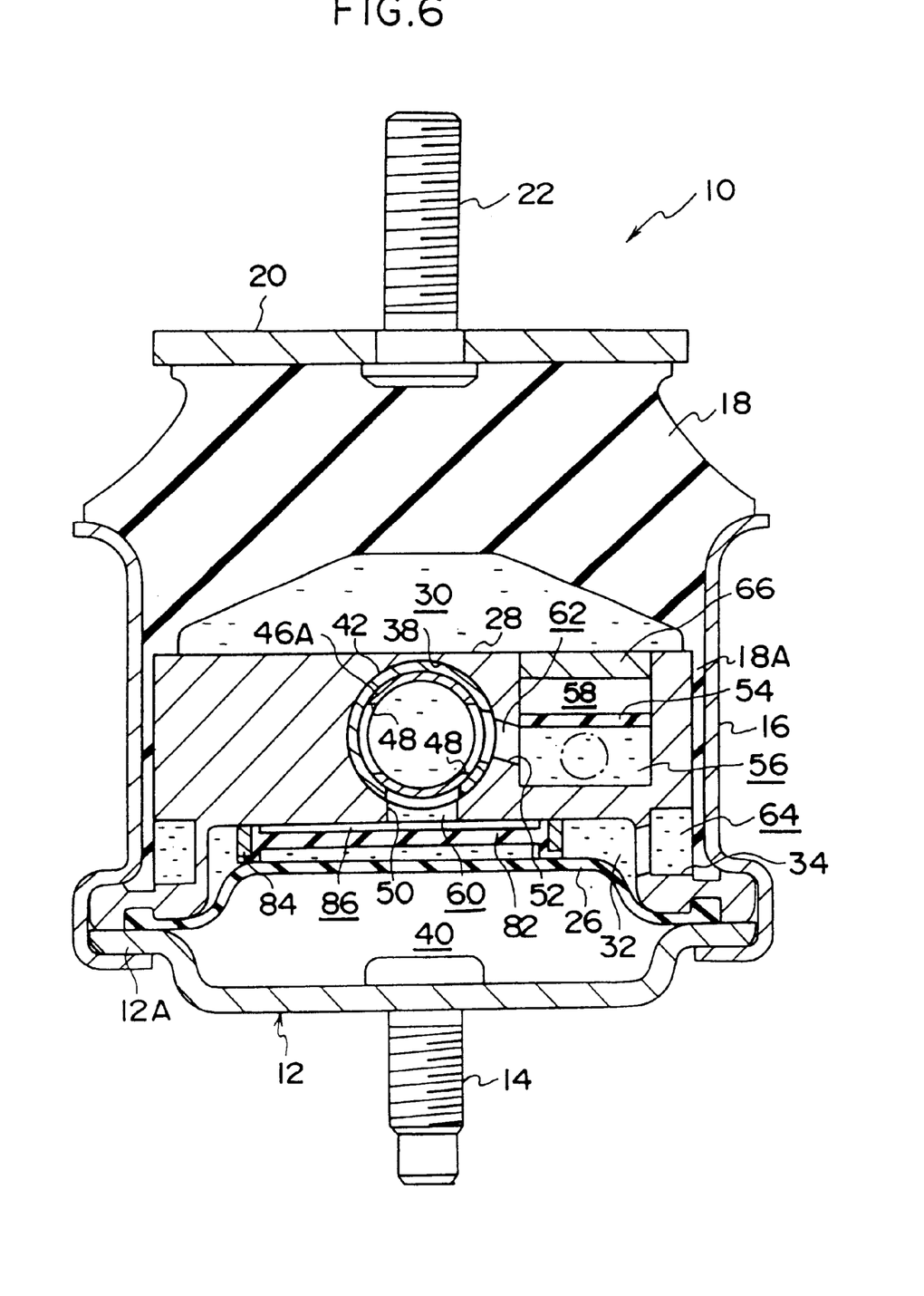
FIG. 6 is a cross-sectional view, taken along line 6—6 in FIG. 5.

In accordance with the above-described structure, the rotor 46 is rotated and, as shown in FIGS. 1 through 3, when the idle orifice 60 is opened by the through-hole 48 of the cylindrical portion 46A, the main liquid chamber 30 and the second auxiliary liquid chamber 86 are communicated via the idle orifice 60. Further, the rotor 46 is rotated by 90° from this position, and as shown in FIGS. 4 through 6, when the orifice 62 for booming is opened by the through-hole 48 of the cylindrical portion 46A, the main liquid chamber 30 and the third auxiliary liquid chamber 56 are communicated via the orifice 62 for booming. As a result, the rotor 46 opens and closes these orifices 60 and 62 and switches the passages.

On the other hand, a through-hole 68 is formed on a side surface of the outer cylinder metal fitting 16 and at a portion of the outer cylinder metal fitting 16 and the thin rubber layer 18A which corresponds to the sleeve 42. A motor 70 serving as an actuator is disposed at the outer circumferential portion of the outer cylinder metal fitting 16 which corresponds to this through hole 68. The motor 70 is fixed to the outer circumferential portion of the outer cylinder metal fitting 16 by screwing an unillustrated attachment screw thereto. A rotational shaft 70A of this motor 70 is connected to the distal end of the narrow shaft portion 46B of the rotor 46.

As described above, the rotor 46 is rotated by the motor 70 so as to select either the position, at which the main liquid chamber 30 and the second auxiliary liquid chamber 86 are communicated via the idle orifice 60 (as shown in FIGS. 1 through 3), or the position, at which the main liquid chamber 30 and the third auxiliary liquid chamber 56 are communicated via the orifice 62 for booming (as shown in FIGS. 4 through 6). This motor 70 is connected to a controller 72 serving as control means such that the rotation of the motor 70 is controlled by the controller 72. The controller 72 is operated by a vehicle power supply, receives detection signals from at least a vehicle speed sensor 74 and an engine speed detection sensor 76, detects vehicle speed and engine speed, and can determine whether idle vibration or shake vibration is generated.

Next, the operation of the present embodiment will be explained.

When the engine disposed on the top plate metal fitting 20 is operated, the vibration of the engine is transmitted to the elastic body 18 via the top plate metal fitting 20. The elastic body 18 serves as a vibration absorbing main body and can absorb vibration due to a vibration damping function which is based on the internal friction of the elastic body 18.

Moreover, the content volume of the liquid within the main liquid chamber 30 and the first auxiliary liquid chamber 32 is changed due to deformation of the elastic body 18 and the first diaphragm 26, and the liquid flows between the main liquid chamber 30 and the first auxiliary liquid chamber 32 via the shake orifice 64. The content volume of the liquid within the main liquid chamber 30 and the second auxiliary liquid chamber 86 is changed due to deformation of the elastic body 18 and the second diaphragm 82, and the liquid flows between the main liquid chamber 30 and the second auxiliary liquid chamber 86 via the idle orifice 60. The content volume of the liquid within the main liquid chamber 30 and the third auxiliary liquid chamber 56 is changed due to deformation of the elastic body 18 and the third diaphragm 54, and the liquid flows between the main liquid chamber 30 and the third auxiliary liquid chamber 56 via the orifice 62 for booming. The vibration isolating effect can be improved due to damping function which is based on viscous resistance of liquid flows and liquid-column resonance generated in these orifice spaces.

In addition to the shake orifice 64 which is invariably opened, the idle orifice 60 and the orifice 62 for booming are provided. Further, the rotor 46 for switching the passages between the idle orifice 60 and the orifice 62 for booming is provided. As a result, the following operation is carried out.

When a vehicle travels at speeds of, for example, 70 to 80 km/h or more, shake vibration (less than 15 Hz) is generated. By the vehicle speed sensor 74 and the engine speed detection sensor 76, the aforementioned controller 72 determines whether the shake vibration is generated. If the controller 72 determines that the shake vibration is generated, the controller 72 operates the motor 70 such that the rotor 46 is rotated. As shown in FIGS. 4 through 6, the through-holes 48 are disposed so as to correspond to the orifice 62 for booming and not correspond to the idle orifice 60.

In this way, the idle orifice 60 is closed, the main liquid chamber 30 and the first auxiliary liquid chamber 32 are communicated via the shake orifice 64, which is invariably opened, and the main liquid chamber 30 and the third auxiliary liquid chamber 56 are communicated via the orifice 62 for booming.

As a result, the changes in pressure which is based on the engine vibration generated within the main liquid chamber 30 are transmitted to the liquid within the shake orifice 64 and the orifice 62 for booming, and the shake vibration is absorbed by receiving the liquid resistance or the like.

Further, booming noise (50 to 100 Hz), which is a vibration having a high frequency and small amplitude, may be generated together with the shake vibration. Since liquid-column resonance is generated within the orifice 62 for booming built in the partitioning member 28 and dynamic spring constant of the vibration is reduced, the booming noise is absorbed.

Moreover, when the vehicle is idling or traveling at speeds of 5 km/h or less, idle vibration (20 to 40 Hz) is generated. By the vehicle speed sensor 74 and the engine speed detection sensor 76, the controller 72 determines whether the idle vibration is generated. If the controller 72 determines that the idle vibration is generated, the controller rotates the motor 70. As shown in FIGS. 1 through 3, the through-holes 48 are disposed so as to correspond to the idle orifice 60 and not correspond to the orifice 62 for booming.

In this way, the orifice 62 for booming is closed, and the liquid moves reciprocally between the main liquid chamber 30 and the second auxiliary liquid chamber 86 via the idle orifice 60 which has small transit resistance. Since liquid-column resonance is generated within the idle orifice 60 and dynamic spring constant of the vibration is reduced, the vibration is absorbed.

Further, the second diaphragm 82 is formed more rigid than the first diaphragm 26, and the shake orifice 64 which connects the main liquid chamber 30 and the first auxiliary liquid chamber 32 is invariably opened. Consequently, as it is difficult to deform the second diaphragm 82 due to the increase in the rigidity in the second diaphragm 82, the liquid also flows to the shake orifice 64 side. As a result, due to the vibration having a low frequency range which is similar to the shake vibration and which may be generated at the time in which the idle vibration is vibrated, the first diaphragm 26 can be deformed.

Therefore, the first diaphragm 26 is deformed, the vibration having a low frequency range which may be generated at the same time that the idle vibration is vibrated can be damped by the shake orifice 64 which connects the main liquid chamber 30 and the first auxiliary liquid chamber 32.

In short, in accordance with the vibration isolating apparatus 10 of the present embodiment, the shake vibration is damped, dynamic spring constant of the idle vibration is reduced, and the vibration having a low frequency range which may be generated at the same time that the idle vibration is vibrated is damped. Thus, the vibration having any vibration frequency is absorbed appropriately and the wide range of vibrations can be reduced.

More specifically, assume that the vibration generating portion is an engine and the vibration receiving portion is a vehicle body as described in the present embodiment. As mentioned above, the vibration having a low frequency range such as shake vibration or the like which is generated when the vehicle travels at a high speed range is damped. At the time of idling in which the vibration having a high frequency range such as idle vibration or the like is generated, liquid-column resonance is generated and dynamic spring constant of the vibration is reduced. The respective vibrations are thereby reduced. Moreover, idle vibration which is tertiary vibration of the engine is generated at the time of idling, and at the same time, roll resonance of the engine which is vibration having a low frequency range and is primary vibration of the engine of approximately 10 Hz is generated. The roll resonance can be also reduced by providing damping function within the frequency range of roll resonance of this engine.

On the other hand, the vibration isolating apparatus of the present embodiment is different from the conventional one in which the membrane is provided on the opposite side of the partitioning member 28 with respect to the main liquid chamber 30. In the present embodiment, the second diaphragm 82 is disposed on the first auxiliary liquid chamber 32 side of the partitioning member 28.

If the second diaphragm 82 is provided on the opposite side of the partitioning member 28 with respect to the main liquid chamber 30, the second diaphragm 82 is deformed so as to absorb the internal pressure of the main liquid chamber 30 at the time in which vibration having a low frequency range is generated. Thus, there is worry that the loss of internal pressure of the main liquid chamber 30 is great and that the damping of the shake vibration is insufficient. However, in accordance with the present embodiment, because the second diaphragm 82 is not provided on the opposite side of the partitioning member 28 with respect to the main liquid chamber 30, the loss of internal pressure of the main liquid chamber 30 is small and there is no worry that the damping of the shake vibration is insufficient.

In contrast, in the present embodiment, since the orifice 62 for booming and the third auxiliary liquid chamber 56 are built in the partitioning member 28, the orifice 62 for booming can be formed short and the space for disposing the third auxiliary liquid chamber 56 is taken up sufficiently. As a result, the rigidity in the third diaphragm 54, which is an elastically deformable partitioning member of the third auxiliary liquid chamber 56, can be set freely and the degrees of freedom in setting resonance frequency of the liquid-column resonance is increased.

In the present embodiment, the second air chamber 58, which is filled with gas such as air or the like, is also built in the partitioning member 28 so as to be adjacent to the third auxiliary liquid chamber 56 with the elastically deformable third diaphragm 54 of the third auxiliary liquid chamber 56 therebetween. As a result, the volume of the second air chamber 58 can be also set freely and the degrees of freedom in setting the resonance frequency of the liquid-column resonance is further increased.

The purpose of the present embodiment is to isolate vibration of the engine disposed on the vehicle. However, it goes without saying that the vibration isolating apparatus of the present invention is used for other purposes, and further, the configuration or the like is not limited to that of the present embodiment.

Moreover, in the present embodiment, the rotor is rotated by the motor. However, the present invention is not limited to this. The actuator which rotates the rotor may be an actuator other than the motor and the valve may be a valve or the like other than the rotor.

Furthermore, in the above-described embodiment, the bottom plate metal fitting 12 serving as a first attaching member is attached to the vehicle body and the top plate metal fitting 20 serving as a second attaching member is attached to the engine. However, the opposite structure may be used.

What is claimed is:

1. A vibration isolating apparatus, comprising:
    a first attaching member which is connected to one of a vibration generating portion and a vibration receiving portion;
    a second attaching member which is connected to another of the vibration generating portion and the vibration receiving portion;
    an elastic body which is disposed between said first attaching member and said second attaching member;
    a main liquid chamber whose portion of a partitioning wall is formed by said elastic body, said main liquid chamber being filled with liquid, and the content volume of said main liquid chamber being changed due to deformation of said elastic body;
    a first auxiliary liquid chamber which is communicated with said main liquid chamber by a passage and which is filled with the liquid;
    a first diaphragm which is elastically deformable and forms at least a portion of a partitioning wall of said first auxiliary liquid chamber;
    a partitioning member which partitions said main liquid chamber and said first auxiliary liquid chamber;
    a second auxiliary liquid chamber which is communicated with said main liquid chamber by a passage and which is filled with the liquid;
    a second diaphragm which is elastically deformable and forms at least a portion of a partitioning wall of said second auxiliary liquid chamber and which is more rigid than said first diaphragm;
    a valve which opens and closes the passage connecting said main liquid chamber and said second auxiliary liquid chamber; and
    an actuator which is connected to and operates said valve.

2. A vibration isolating apparatus according to claim 1, wherein said second diaphragm is disposed at said first auxiliary liquid chamber side of said partitioning member and is separated from the main liquid chamber so as to not change the internal pressure of said main liquid chamber.

3. A vibration isolating apparatus according to claim 1, wherein said valve is disposed within said partitioning member.

4. A vibration isolating apparatus according to claim 3, wherein said actuator includes a motor which is connected to said valve, and said valve is rotated by the motor such that the passage between said main liquid chamber and said second auxiliary liquid chamber is opened and closed.

5. A vibration isolating apparatus according to claim 3, wherein said valve is pipe-shaped whose inner portion is hollow, and through-holes, which communicate with the inner portion, are opened at portions of the outer circumferential surface of said valve.

6. A vibration isolating apparatus according to claim 3, wherein said partitioning member includes a hollow passage which connects said main liquid chamber and said second auxiliary liquid chamber.

7. A vibration isolating apparatus according to claim 3, wherein said partitioning member is formed substantially disc-shaped, and one of said first attaching member and said second attaching member includes an outer cylinder in which said partitioning member is built.

8. A vibration isolating apparatus according to claim 7, wherein said actuator is disposed at the outer side of the outer cylinder.

9. A vibration isolating apparatus according to claim 1, further comprising:
    a third auxiliary liquid chamber which is communicated with said main liquid chamber by a passage and which is filled with the liquid; and
    a third diaphragm which is elastically deformable and forms at least a portion of a partitioning wall of said third auxiliary liquid chamber and which is more rigid than said first diaphragm.

10. A vibration isolating apparatus according to claim 9, wherein the passage for communicating said main liquid chamber and said third auxiliary liquid chamber can be opened and closed.

11. A vibration isolating apparatus according to claim 9, wherein the passage for communicating said main liquid chamber and said third auxiliary liquid chamber can be opened and closed by said valve.

12. A vibration isolating apparatus according to claim 9, wherein the passage for communicating said main liquid chamber and said second auxiliary liquid chamber and the passage for communicating said main liquid chamber and said third auxiliary liquid chamber are selectively opened and closed by said valve.

13. A vibration isolating apparatus, comprising:
- a first attaching member which is connected to one of a vibration generating portion and a vibration receiving portion;
- a second attaching member which is connected to another of the vibration generating portion and the vibration receiving portion;
- an elastic body which is disposed between said first attaching member and said second attaching member;
- a main liquid chamber whose portion of a partitioning wall is formed by said elastic body, said main liquid chamber being filled with liquid, and the content volume of said main liquid chamber being changed due to deformation of said elastic body;
- a first auxiliary liquid chamber which is communicated with said main liquid chamber by a passage and which is filled with the liquid;
- a first diaphragm which is elastically deformable and forms at least a portion of a partitioning wall of said first auxiliary liquid chamber;
- a partitioning member which partitions said main liquid chamber and said first auxiliary liquid chamber;
- a second auxiliary liquid chamber which is communicated with said main liquid chamber by a passage and which is filled with the liquid;
- a second diaphragm which is elastically deformable and forms at least a portion of a partitioning wall of said second auxiliary liquid chamber and which is more rigid than said first diaphragm;
- a third auxiliary liquid chamber which is disposed within said partitioning member, which is communicated with said main liquid chamber by a passage, and which is filled with the liquid;
- a third diaphragm which is elastically deformable and forms at least a portion of a partitioning wall of said third auxiliary liquid chamber and which is more rigid than said first diaphragm;
- a valve which opens and closes the passage connecting said main liquid chamber and said second auxiliary liquid chamber and the passage connecting said main liquid chamber and said third auxiliary liquid chamber; and
- an actuator which is connected to and operates said valve.

14. A vibration isolating apparatus according to claim 13, wherein said partitioning member includes an air chamber which is filled with air and which is adjacent to said third auxiliary liquid chamber with said third diaphragm therebetween.

15. A vibration isolating apparatus according to claim 13, wherein the passage for communicating said main liquid chamber and said second auxiliary liquid chamber and the passage for communicating said main liquid chamber and said third auxiliary liquid chamber are selectively opened and closed by said valve.

16. A vibration isolating apparatus according to claim 13, wherein one of said first attaching member and said second attaching member includes an outer cylinder in which said partitioning member is built.

17. A vibration isolating apparatus according to claim 16, wherein the outer cylinder includes an air chamber which is filled with air and which is adjacent to said first auxiliary liquid chamber with said first diaphragm therebetween.

18. A vibration isolating apparatus according to claim 13, wherein the passage for communicating said main liquid chamber and said first auxiliary liquid chamber forms a restricting passage for damping shake vibration, the passage for communicating said main liquid chamber and said second auxiliary liquid chamber forms a restricting passage for damping idle vibration, and the passage for communicating said main liquid chamber and said third auxiliary liquid chamber forms an orifice for damping booming noise.

* * * * *